Aug. 16, 1966 J. KRITZ 3,267,414

PORTABLE UNDERWATER COMMUNICATION UNIT

Filed Nov. 13, 1963 6 Sheets-Sheet 1

INVENTOR.
JACK KRITZ

BY

Nolte & Nolte

ATTORNEYS

INVENTOR.
JACK KRITZ

BY

Nolte & Nolte
ATTORNEYS

PORTABLE UNDERWATER COMMUNICATION UNIT

Filed Nov. 13, 1963 6 Sheets-Sheet 3

INVENTOR.
JACK KRITZ
BY
Nolte & Nolte
ATTORNEYS

INVENTOR.
JACK KRITZ
Nolte & Nolte
ATTORNEYS

INVENTOR.
JACK KRITZ

BY

Nolte & Nolte
ATTORNEYS

PORTABLE UNDERWATER COMMUNICATION UNIT

Filed Nov. 13, 1963 6 Sheets-Sheet 6

INVENTOR.
JACK KRITZ

BY

Nolte & Nolte
ATTORNEYS

United States Patent Office 3,267,414
Patented August 16, 1966

3,267,414
PORTABLE UNDERWATER COMMUNICATION UNIT

Jack Kritz, Westbury, N.Y., assignor to Janus Products Incorporated, Westbury, N.Y., a corporation of Delaware Filed Nov. 13, 1963, Ser. No. 323,492
2 Claims. (Cl. 340—3)

The present invention relates to underwater communication equipment. More specifically, this invention pertains to apparatus enabling communcation, voice and/or code, between a plurality of underwater divers or between a diver and vessel. Additionally, the invention contemplates the use of such apparatus as an underwater tracking or homing aid, and for diver locating and safety purposes.

A serious problem confronting deep sea divers is the lack of dependable means of communication between themselves, and between the divers and vessel from which they were launched. Speech undrewater is severely limited and systems utilizing radio energy as a communication link are impractical because of the high losses in water.

Accordingly, it is an object of this invention to provide apparatus which may be conveniently utilized to enable clear voice and code communication underwater.

A more specific object of the invention is to enable such communication between a diver and vessel, or between a plurality of divers.

Still another object is to provide a navigational aid for use underwater.

Another object is to provide a device which may be used for diver locating, tracking and homing purposes.

Yet another object is to provide an underwater safety aid.

Briefly, these objects are accomplished by providing the diver with a communication unit capable of receiving and detecting a voice modulated, ultrasonic acoustical signal. The detected audio frequency is then coupled to a conventional earpiece or speaker whereby the diver can hear the original voice intelligence. The transmitted acoustical or sonar energy is highly directional, and the communication unit is a lightweight, battery powered unit contained in a flashlight type housing. Additionally, the communication unit may include a miniature sonar transmitter enabling the diver to send coded information back to the original sender or to other divers. The provision of such a transmitter would further provide the diver with a doppler capability of recognizing relative movement between himself and a target for purposes described hereinbelow.

As a further refinement, the diver's transmitted signal may be voiced modulated by the addition of a microphone to the diver's face gear, and modulating equipment packed, if desired, in a small unit detachably secured to the above-mentioned flashlight container.

The manner in which the above and other objects of the invention are accomplished will be explained in greater detail with reference to the following detailed description and drawings, wherein.

Figure 9A:
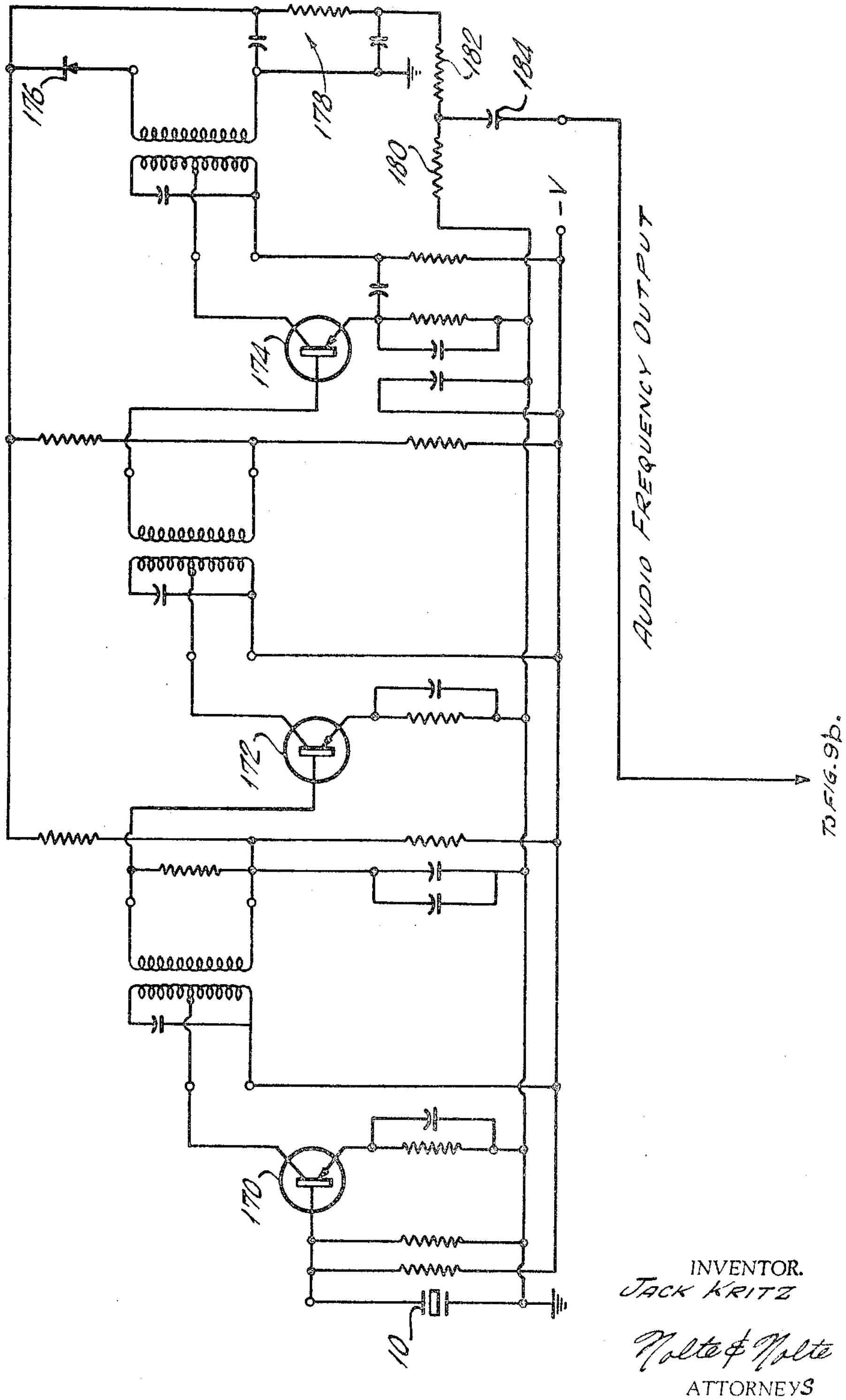
Figure 9B:
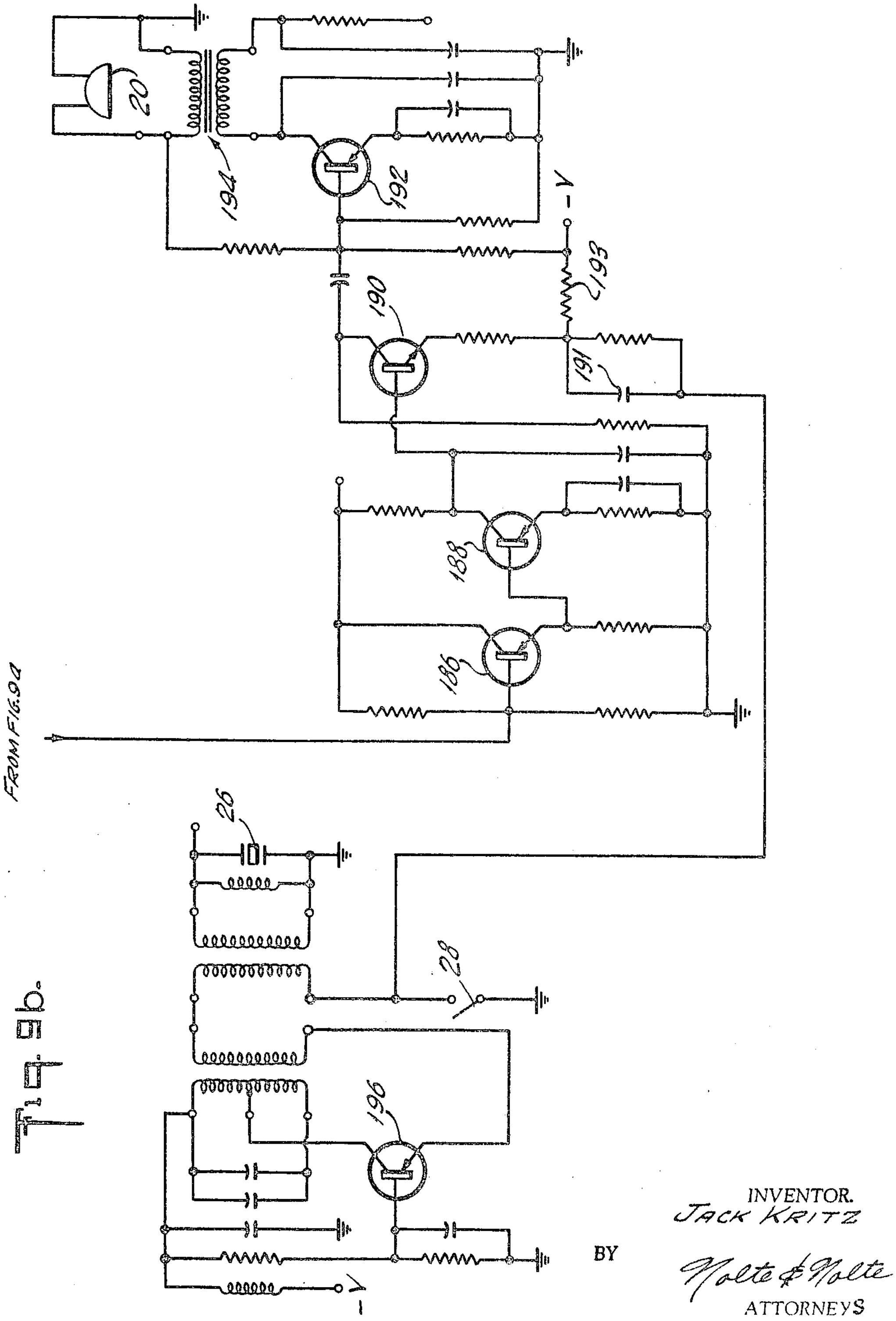

FIGURES 9*a* and 9*b* are schematic diagrams of the circuit in the communication unit.

Figure 10:
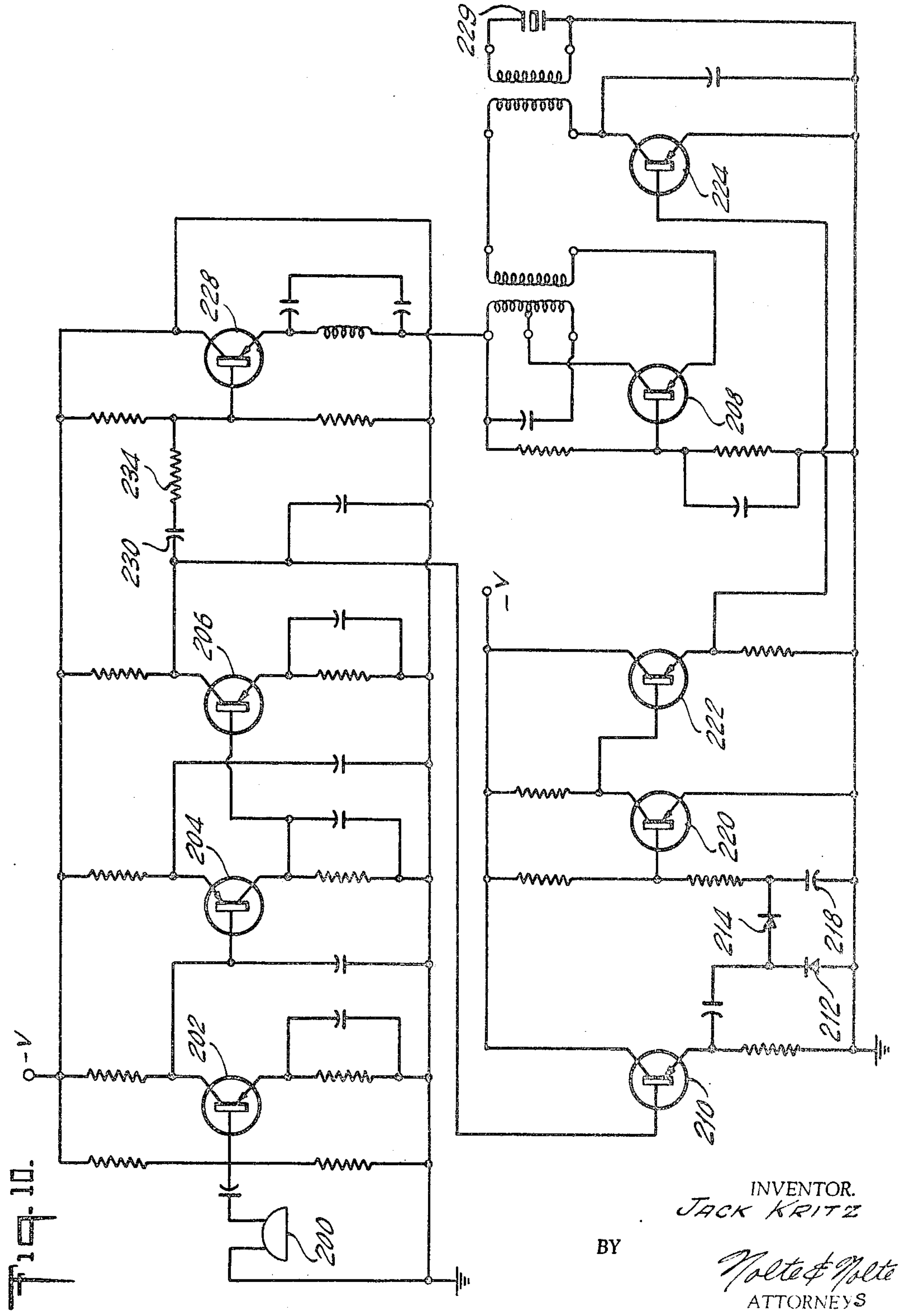

FIGURE 10 is a schematic diagram of the voice modulator circuit.

A communication unit according to the present invention may be used in conjunction with the type of transmitter disclosed in U.S. patent application No. 235,038 of Jack Kritz, filed on November 2, 1962. A transmitter therein described is capable of sending a highly directional beam of ultrasonic energy through the water. The transmitter may be mounted on a surface vessel in such a manner that the underwater transducers may scan in azimuth and elevation to position the radiated beam in a desired direction. To enable communication, the transmitted energy may be modulated in accordance with conventional practices. Specifically, and for the present purposes of explanation, it will be assumed that the sonar beam has been amplitude modulated in accordance with a voice control input. The communication unit of this invention provides a small portable device, of particular advantage to an underwater swimmer or diver, with which to receive such signals, and, if necessary, signal back to the transmitting party. Thus, voice communications is possible for extended distances underwater, which heretofore has been severely limited in practice.

Figure 1:
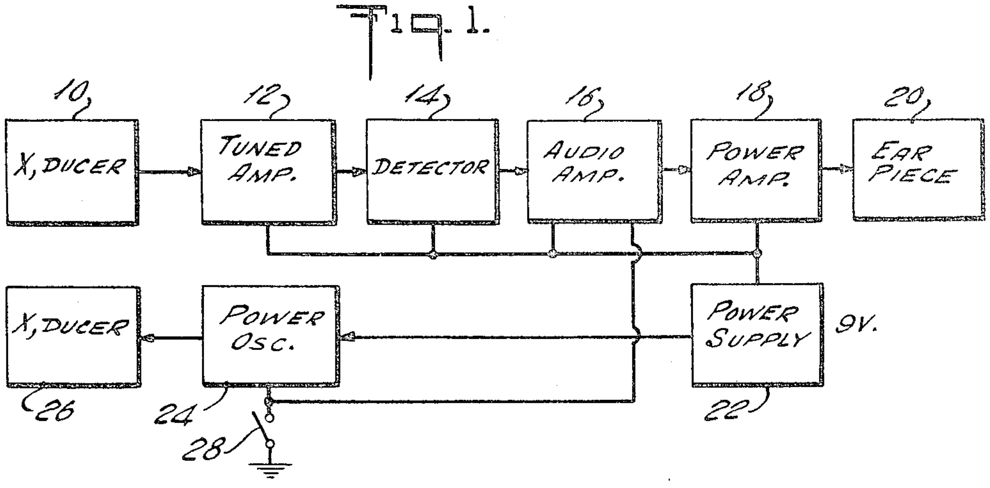
FIGURE 1 is a block diagram of the circuit employed in the diver communication unit according to the invention.

FIGURE 1 illustrates in block diagram form an electrical system which may be used in accordance with the principles of the invention. As described in greater detail below, this entire system (except for the diver's earpiece) is housed in a small watertight container readily carried by the diver or receiving party. The unit includes a receiver transducer 10, also highly directional, which when directed toward the transmitter, picks up the ultrasonic acoustical energy and converts it to an electrical signal having identical frequency and amplitude characteristics.

The amplitude modulated electrical signal from transducer 10 is coupled to the input of a tuned amplifier 12, which is tuned to the frequency of the original carrier. The output of tuned amplifier 12 is fed to a demodulator or detector 14 which produces an audio frequency signal. whose variations correspond to the original voice signal. The audio output of detector 14 is amplified by audio amplifier 16 and power amplifier 18 from which it is coupled to the diver's earpiece 20 to convert the electrical energy into sound. In this manner, the diver can reiceive intelligible voice communication from a vessel or other diver equipped with the necessary means of transmission.

The power supply 22, which provides the required operating voltages, may comprise a battery or battery pack adapted to fit within the watertight container.

The unit also includes a transmitter section which consists of a power oscillator 24 and transmitting transducer 26, identical to transducer 10, coupled to power supply 22. Closure of switch 28 applies the requisite operating voltage to oscillator 24 causing transducer 26 to emit a highly directional beam of acoustical energy at the frequency of oscillator 24. By opening and closing "beeper" switch 28 energy is transmitted in pulses enabling a coded response to the vessel or to a diver equipped with a receiver such as the one described above.

Transducer 26 is also coupled to transducer 10 to feed a portion of the transmitted energy back to the receiver circuitry. The manner in which this is accomplished is dependent upon the physical mounting of the transducer in the unit container, and is illustrated in detail below. This feature is important because it provides a doppler mode of operation in which the diver can detect relative movement between himself and a target. Thus, when switch 28 is closed the directional beam of acoustical energy emitted from transducer 26, may be reflected from a target, and the reflected wave picked up by transducer 10. If there is relative movement between the target and transmitter, the reflected waves will differ from the transmitted waves due to the Doppler effect. Hence, the reflected waves will mix with the energy fed back from transducer 26 to yield a beat frequency at the output of amplifier 12. The beat frequency fed through the remaining receiver circuitry will produce an audible tone in earpiece 20. A control lead of one stage of audio amplifier 16 may be connected to switch 28, whereby closure of the switch will increase the audio gain when the unit is operated in its Doppler mode.

Coded communication between divers in possession of the communication unit is also possible, if the respective units transmit at slightly different frequencies. Hence, with switch 28 closed, a received frequency will beat with the transmitted frequency to provide an audible tone. The difference in various tones will tell the diver with which of the other units he is in communication.

The physical construction of the unit will be described with reference to FIGS. 2–7. All of the circuits illustrated in FIGURE 1 are housed in a cylindrical container, indicated generally at 30, whose shape is similar to that of a common flashlight. The size of the container is small so that a diver may easily hold it in one hand to position the sonar beam in any desired direction.

Earpiece 20 is separate from container 30 and electrically coupled thereto by wire 33. The earpiece may be a conventional bone conduction earphone which is simply slipped inside the diver's hood or under the strap of his mask.

Container 30 includes an enlarged threaded forward portion 32 and a threaded rear portion 34. A circular retainer disc 38 covers a round supporting plate 36 and is secured to container 30 by means of a threaded cylindrical cover 40 which screws onto end portion 32. The transducers 10 and 26 are secured to the interior side of support plate 36 by means of a transducer cement 42.

The main body of container 30 houses a forward mounting assembly 48 and a rear mounting assembly 50. Both of these assemblies are made of a known insulating material, and fit snugly within the interior wall of the container. Forward assembly 48 is urged against an annular washer 52 which is braced against an inwardly extending circumferential protrusion 54 of the container 30.

Figures 6, 7:
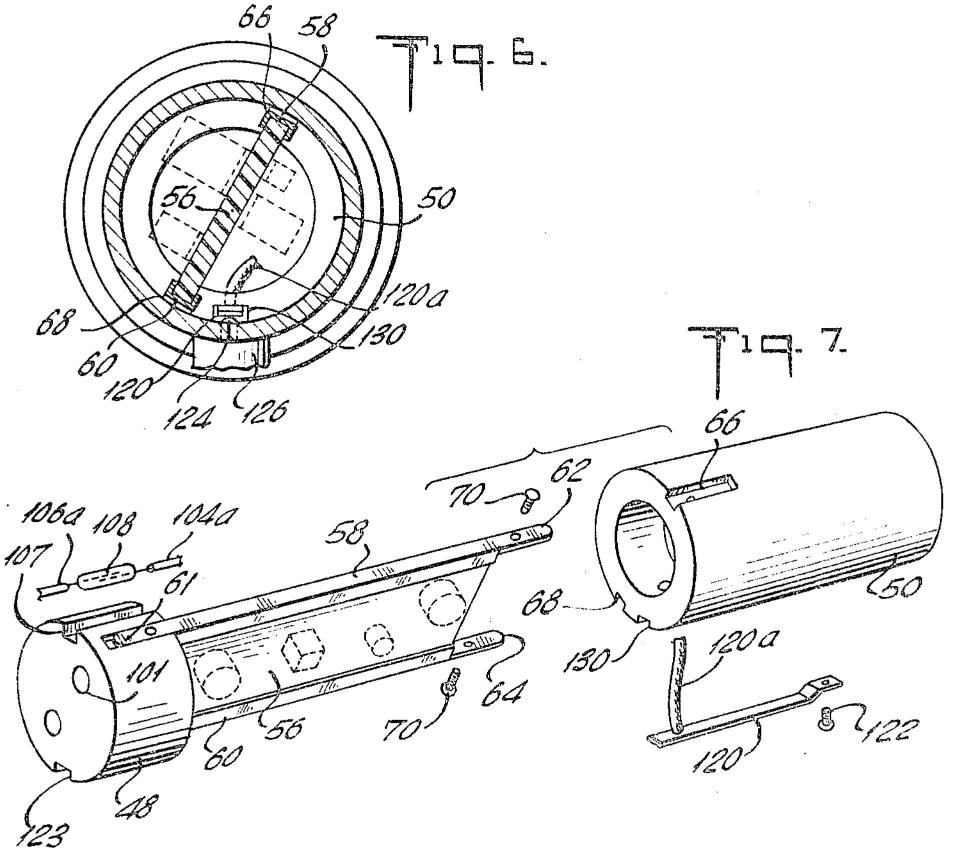
FIGURE 6 is a sectional view along the line 6—6 of FIGURE 3.
FIGURE 7 is an exploded view of the unit's circuit mounting assembly.

The electrical components (shown in dotted lines) are mounted in a known manner on a mounting board 56. As shown in FIG. 7, upper and lower securing bars 58 and 60, respectively, secure the mounting board to assemblies 48 and 50. Securing bars 58 and 60 are U shaped in cross section (see FIG. 6) to thus hold mounting board 56, and include at their extremities, flat connecting tabs 61, 62 and 63, 64, respectively. The forward assembly 48 includes opposed grooves 65 and 67 for receiving tabs 61 and 63, respectively, while tabs 62 and 64 may be inserted in corresponding grooves 66 and 68 of rear mounting assembly 50. After the mounting board 56 has been inserted into the securing bars 58 and 60, the connecting tabs are placed in their corresponding grooves, and the assembly completed by the insertion of screws 70 into suitable apertures through the tabs and mounting assemblies.

Rear assembly 50 includes an integral central plate 72 in the center of which a disc-like contact button 74 is mounted. Contact 74 is connected to the circuit mounted on board 56 via lead 74*a*. Power supply 22, which consists of a battery 22 with terminals 76 and 79, is coupled through contact 74 to the electronic components mounted on board 56.

A coil spring 78 compressed between plate 72 and battery 77 holds the latter in a normally non-engaging relationship with contact button 74. Engagement of the contact and battery is effected by the operation of an on-off switch 80 which physically moves the battery into contact with button 74.

Switch 80 is conventional and includes a hollow cylinder 81 mounted on a disc 82 which is supported at the end of cylinder portion 32 between a water-tight gasket 84 and screw-on rear cover 86. A round contactor plate 88 engages the terminal 79 of battery 77. Plate 88 is secured to an actuator rod 90 which passes centrally through cylinder 90 into threaded engagement with the interior surface of a knurled cylindrical knob 91. Knob 91 is rotatable with respect to cylinder 81, and means are provided to maintain the two in a fixed relationship so that rotation of the actuator knob will move actuator rod 90 into container 30 until battery terminal 76 engages contact 74. A coil spring 92 compressed between the end of cylinder 81 and plate 88 normally biases the battery toward contact 74.

At the front end of the assembly, transducer 10 is electrically coupled to the mounting board through a pointed contacting head 98 supported on a thin stem 100 mounted in an offset aperture 101 in the front end of forward mounting assembly 48. Lead 100*a* couples stem 100 to mounting board 56. A small coil spring 102 compressed between head 98 and assembly 48 continually urges the former into contacting relationship with transducer 10. Similarly, transducer 26 is coupled via contacting head 99 to the circuits mounted on board 56.

It is recalled that the unit also includes a transmitter which may be intermittently keyed by switch 28 to provide an audible signal, or, alternatively, locked in an energized state to produce a steady state beam. Switch 28 includes spring contacts 104 and 106 in a protective envelope 108, which, in turn, is located in a notch 107 in assembly 48. The contacts are coupled by respective insulated leads 104*a* and 106*a* to the proper terminals on mounting board 56. The switch is a conventional magnetically actuated switch wherein the contacts are adapted to close when they are subjected to a predetermined magnetic field. The magnetic field in this case is provided by a small magnetic disc 112 located in the base of a switch actuator 113 shaped like an inverted T.

A housing unit 110 is secured to the outer surface of container 30 with a washer 115 positioned between the two for sealing purposes. A rectangular plate 114 retains magnet 112 in actuator 113, and the entire actuator assembly is biased upwardly by a compressed coil spring 116. The stem of actuator 113 extends through an aperture 115 in the top of housing 110, the aperture being sized to enable horizontal movement of the actuator to the rear of the unit. Toward this end also, the lower interior portion of housing 110 includes a notched portion 118 adapted to receive and hold the rear base portion of actuator 113. When the operator presses actuator 113 down, the field of magnetic disc 112 closes contacts 104 and 106. When the actuator is released, spring 116 returns it to its original position, whereby the operator may rapidly key the transmitter on and off to provide the audible tone described above. To maintain the transmitter on, the actuator 113, after it is depressed, is simply pushed toward the back of the unit so that the rear of the actuator base is securely held in notch 118.

The earphone connection includes a leaf spring contact 120 mounted in a groove 121 of assembly 50 by means of screw 122. Spring contact 120 is coupled to the output of the circuit mounted on board 56 by lead 120*a*. An output conduit 126 extends transversely from container 30 and is adapted to receiver connector 128 of earpiece 20. Connector 128 includes a male member 124 which passes through insulated bushing 129 into engagement with spring contact 120 to effect the connection. Thus, to receive a transmitted signal, connector 128 is inserted in conduit 126, and actuator knob 91 rotated until battery 77 has been placed in the receiver circuit through contact 74.

FIGURES 9*a* and 9*b* comprise a schematic circuit of the system illustrated in block form in FIGURE 1. The modulated sonar carrier wave impinging on receiving transducer 10 is converted to electrical energy and coupled to the first stage of tuned IF amplifier 12, which is a conventional three-stage transformer coupled amplifier, including PNP transistors 170, 172, and 174. Detector 14 comprises diode 176 coupled to the output of the last stage of the IF amplifier. A capacitive filter circuit 178 removes the high frequency components from the detector output, which may be derived from the junction of a pair of voltage dividing resistors 180 and 182.

The audio frequency output of the detector is fed via capacitor 184 to the base of an emitter follower 186 (FIG. 9*b*) which isolates the remaining amplifier stages from the preceding stages. The output of emitter follower 186 is coupled to the base of transistor 188 which is the first stage of audio amplifier 16. The next stage of amplification is a variable gain stage and comprises transistor 190 having capacitor 191 and resistor 193 connected in its emitter circuit. One end of capacitor 191 is coupled to one side of beeper switch 28, so that when the switch is closed the capacitor is grounded. The purpose of the variable gain stage is to increase the gain of the audio amplifier when the device is operating in its Doppler mode. Thus, when switch 28 is closed, turning the transmitter on, capacitor 191 acts as an A.C. bypass for resistor 193. In an operative embodiment, closure of switch 28 increased the gain of this stage by a factor of four. The output of variable gain stage 190 is A.C. coupled to the base of transistor 192, a power amplifier, the output of which is coupled by transformer 194 to earpiece 20.

The transmitter oscillator includes transistor 196. The operation of this circuit is fully described in the abovementioned application No. 235,038 and will not be further described. When beeper switch 28 is open, the high negative voltage applied to the emitter of transistor 196 inhibits oscillation. However, when switch 28 is closed, applying a ground voltage to the emitter, oscillation occurs and transmitter transducer 26 emits a sonar beam at the carrier frequency. Opening and closing beeper switch 28 keys the transmitter on and off, producing a signal which may be detected as an audible sequence of beeps.

If the device is to operate in the Doppler mode, it is necessary that the transmitted frequency be coupled to the receiver unit for comparison purposes. In the present case, this is accomplished primarily by means of a feedback loop through the transducers 26 and 10. Depending upon the proximity of the two transducers, the manner in which they are secured to the base plate, and various other factors, the transmitted frequency emitted from transducer 26 will be picked up by transducer 10 and fed to the IF amplifier. If the receiver transducer 10 also picks up the transmitted signal reflected from a moving target, the two frequencies, which will differ because of the Doppler effect, will mix together to provide a beat frequency which is fed through the detector circuits and audio amplifier to ear piece 20. The audio tone produced by this beat frequency will thus indicate to the diver that the transmitter is aimed at a target which is moving relative to his own position. This feature may be useful for safety purposes by providing an indication that a moving object, such as the hull of a boat, is approaching the diver.

By way of example, an operative system utilizing the circuit of FIGURES 9*a* and 9*b* may be operated at a frequency of 455 kc. with a nine volt battery.

The invention also contemplates voice modulation of the diver's transmitted signal. The circuits for this purpose may be situated, together with the receiver, in a single housing or they may be located separately in a smaller casing detachably secured to the communication unit.

Figure 8:
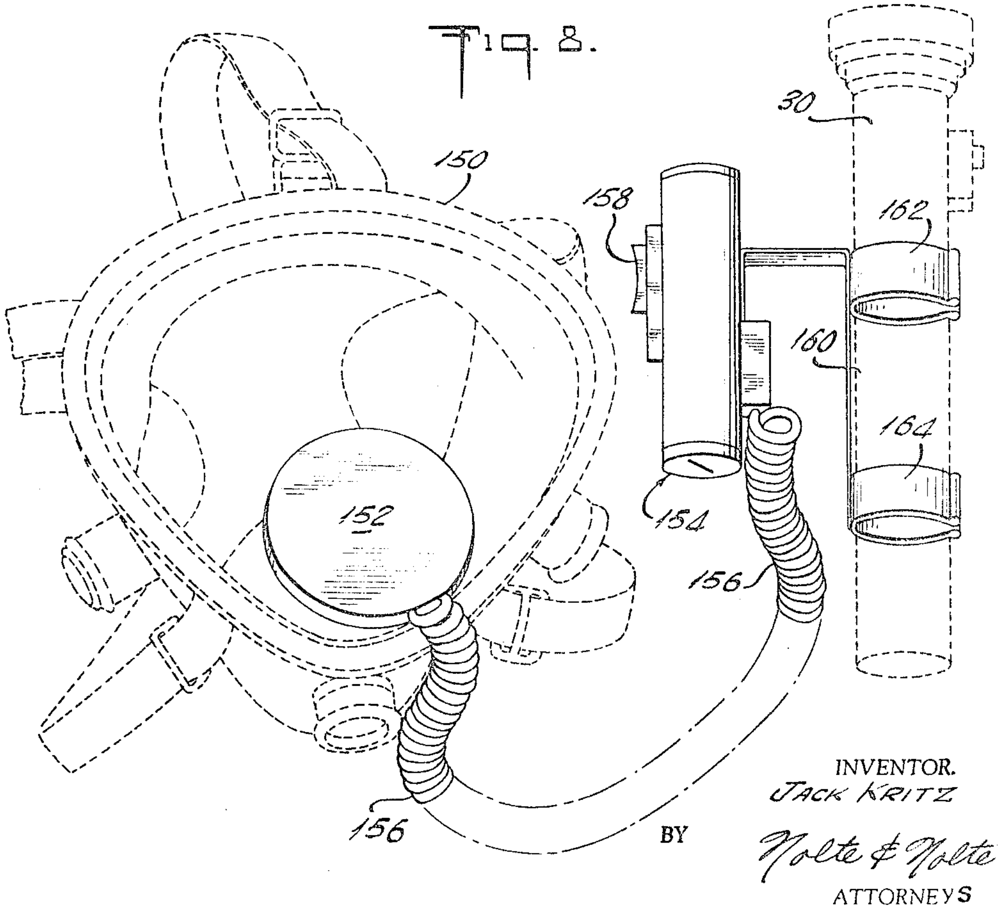
FIGURE 8 is a view in perspective of the face mask and voice modulator unit.
Figure 3:
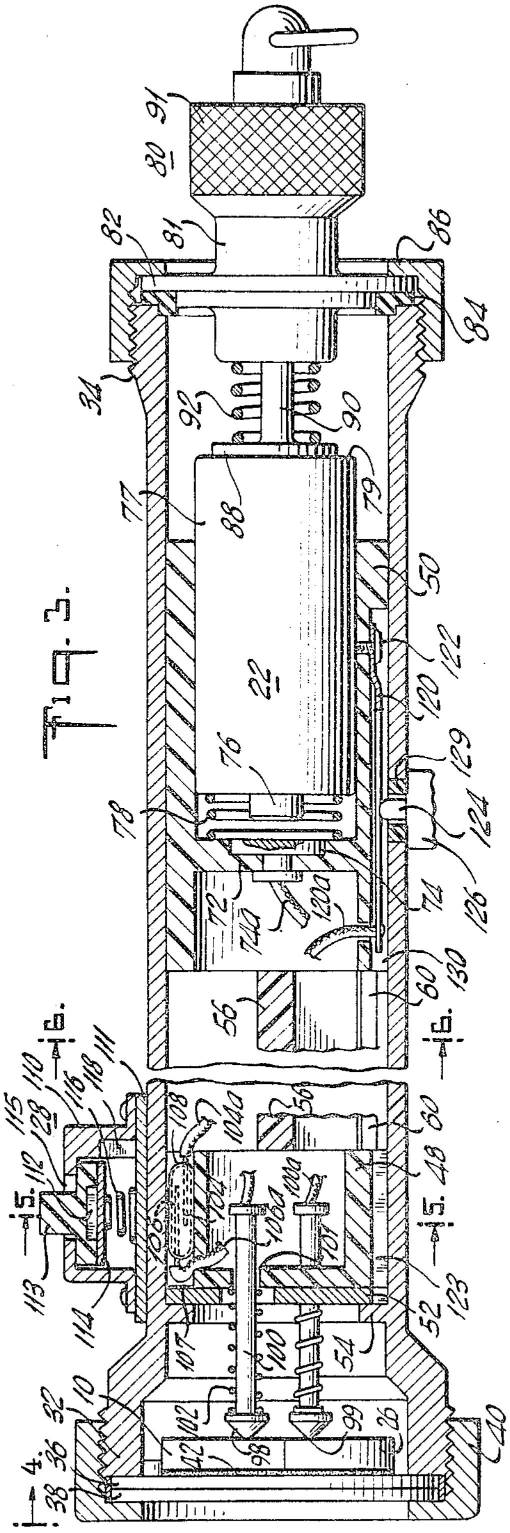
FIGURE 3 is a side view in section of the communication unit.
Figure 2:
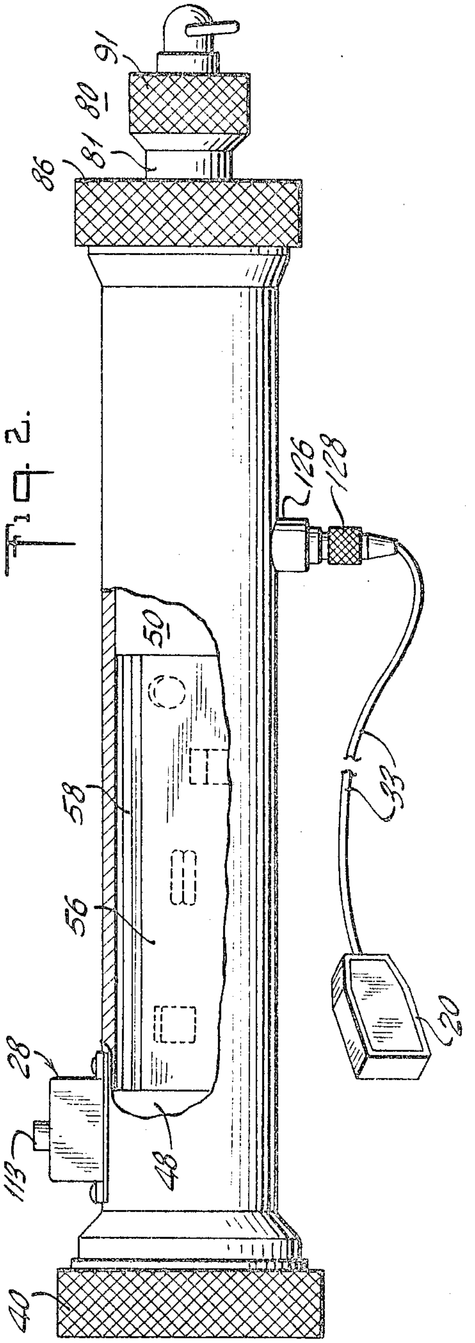
FIGURE 2 is a side view of the communication unit.
Figure 4:
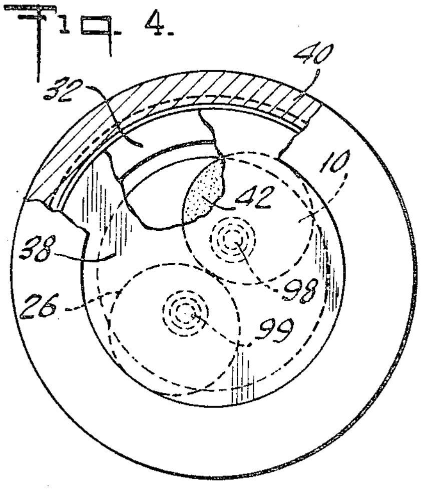
FIGURE 4 is a sectional view, partly cut away, along the line 4—4 of FIGURE 3.
Figure 5:
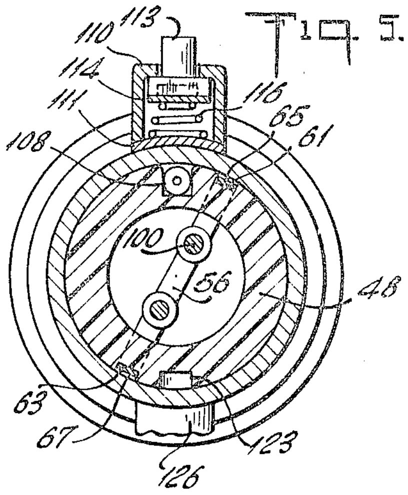
FIGURE 5 is a sectional view along the line 5—5 of FIGURE 3.

The physical arrangement of a system designed to so complement the basic communication unit is shown in FIGURE 8. A diver's mask 150 is provided with a microphone (not shown) which may be slipped into a neoprene pocket 152 cemented to the outside of the face mask so as not to obscure visibility. If preferred, a microphone, sensitive to bone conduction, may instead be placed either on top of the head or on the mastoid bone, and held secure with the diver's hood or strap.

The voice transmitter is a separate unit indicated generally at 154. It is connected by means of a flexible coil 156 to microphone pocket 152. An on-off switch 158 couples the transmitter's separate power supply to the circuit itself, but transmission may be voice controlled so that only when the diver is talking is the carrier on. A metal strap 160 is welded to transmitter 154 and a pair of resilient grips 162 and 164 extend from the strap to detachably secure transmitter 154 and container 30.

FIGURE 10 is a schematic diagram of the circuit contained within voice communicator 154. The diver's microphone 200 couples the voice signals to a three stage audio amplifier comprising transistors 202, 204, and 206. The transmitter oscillator includes transistor 208, and, in this case also, is the same as the basic unit described in U.S. patent application No. 235,038. The output of the audio amplifier is fed to an emitter follower 210, the output of which is coupled to an electronic relay adapted to key the transmitter in response to voice signals. The electronic relay includes a D.C. restoring diode 212, a detector diode 214, capacitor 218, and a trigger circuit including transistors 220 and 222. When the diver speaks into the microphone, a signal appears at the base of emitter follower 210 which is rectified by detector 214 to charge capacitor 218 to a positive voltage. Transistor 220, which is normally conducting, is cut off by the positive voltage on capacitor 218 causing its collector voltage to drop to the negative bias. The drop in voltage, which is coupled to transistor 222, causes transistor 222 to conduct, applying a negative voltage to the base of an oscillator control transistor 224, which is connected in the emitter circuit of oscillator transistor 208. Conduction of transistor 224 applies a ground voltage to the emitter of transistor 208 enabling oscillation which is transformer coupled to transducer 229.

Modulation is achieved by the action of a modulator transistor 228. The base of transistor 228 is coupled via capacitor 230 and resistor 234 to the output of the last stage of the audio amplifier, while the emitter is connected in the collector circuit of oscillator 228. The amplitude of the oscillations of transistor 208 is dependent upon the conduction of transistor 228, which, in turn, is determined by the amplitude of the signal appearing at the collector of the last stage 206 of the audio amplifier, thus providing a form of "plate" modulation.

Many advantages of the present invention will be obvious to one skilled in the art. An operable model of the basic communication unit illustrated in FIGURES 1–8 has been built and proven itself capable of receiving clear intelligible voice communication up to a distance of one thousand feet. With only the basic unit, simple prearranged codes between diver and boat or diver and diver may be utilized, ultimately progressing to the use of sophisticated international morse.

A team of divers each equipped with a communication unit can continuously locate one another within a distance of one thousand feet, and by means of the transmitter switch send coded messages. A diver can also use the Doppler characteristic available in this position to detect fish and to warn him of obstacles in his path. Within two hundred fifty feet he can also hear the telltale swish of his buddy's fins.

From a safety point of view, the diver, when intending to surface, uses his device in its Doppler mode to scan the path above him and thereby detect a moving boat by its wake or propeller. Upon detection of the prop motion, he can track the boat and thus determine whether or not the boat is far enough away to permit him to surface safely. The distances at which he can perform these safety functions, as well as hear fish and underwater obstacles, extends to approximately two hundred fifty feet, although visibility may be zero.

The locked position of his transmitter can also be used as a distress signal, simultaneously permitting either the boat or a similarly equipped diver to home-in and effect rescue.

A voice modulation unit constructed in accordance with the principles of this invention has provided clear wireless voice communication at ranges up to seven hundred and fifty feet.

Although a preferred embodiment of the invention has been shown and described, the invention is not to be limited except as defined in the following claims.

What is claimed is:

1. A portable communication unit adapted to be utilized under water, comprising a water-tight casing, said casing containing therein, first transducer means located at one end of the casing for converting ultrasonic acoustical energy into electrical energy, a battery, amplifier means connected from said transducer means, a detector for producing audio frequency signals coupled from said amplifier means, and an audio amplifier coupled to the output of said detector, and speaker means separate from said casing and connected from the output of said audio amplifier, for converting the amplified audio signals to sound energy, biasing means in circuit relationship with said audio amplifier, second transducer means mounted to said casing, a normally deenergized power oscillator in circuit relationship with said second transducer means, manually operable switch means disposed on the outer surface of said casing and placed in circuit relationship with the biasing means of said audio amplifier and with said power oscillator, the arrangement being such that operation of said switch means simultaneously energizes said power oscillator and increases the gain of said audio amplifier by varying the nature of said biasing means.

2. A portable communication unit according to claim 1, wherein said first and second transducer means are mechanically coupled to each other to produce thereby a resultant frequency output, said output being coupled to said amplifier means to produce a Doppler frequency signal, which is proportional to the relative motion of said unit relative to a fixed position.

References Cited by the Examiner

UNITED STATES PATENTS

| | | | |
|---|---|---|---|
| 2,268,587 | 1/1942 | Guanella | 340—1 X |
| 2,655,645 | 10/1953 | Bagno | 340—227 |
| 3,036,289 | 5/1962 | Beebe et al. | 340—3 |
| 3,079,583 | 2/1963 | Beitscher et al. | 340—3 X |
| 3,123,798 | 3/1964 | Holloway et al. | 340—3 |
| 3,150,346 | 9/1964 | Polly et al. | 340—8 |

CHESTER L. JUSTUS, *Primary Examiner.*

LEWIS H. MYERS, *Examiner.*

R. A. FARLEY, *Assistant Examiner.*